UNITED STATES PATENT OFFICE 2,663,682

PURIFICATION OF ALCOHOLS BY AZEOTROPIC DISTILLATION

Bruno Traeger, Mulheim-Heissen, and Walter Rottig, Oberhausen-Sterkrade-Nord, Germany, assignors to Ruhrchemie Aktiengesellschaft, Oberhausen-Holten, Germany, a joint-stock company of Germany No Drawing. Application November 16, 1949, Serial No. 127,796

Claims priority, application Germany July 23, 1949

1 Claim. (Cl. 202—42)

This invention relates to the separation of oxygen-containing organic compounds, for instance alcohols, from their mixtures with aliphatic hydrocarbons.

It is an object of this invention to provide a process of separation based on simple distillation of the mixture resulting in a practically complete isolation of the oxygen compounds such as alcohols etc.

It is another object of this invention to provide means whereby higher molecular alcohols can be separated from mixtures with aliphatic hydrocarbons such as are obtained in the catalytic hydrogenation of carbon monoxide.

Oxygen-containing organic compounds and more especially higher molecular alcohols have been recovered from their mixture with hydrocarbons in different ways. For instance, selective extraction with certain solvents, amongst them aniline, glycol and nitrobenzene enable oxygen-containing compounds and more especially alcohols to be separated from mixtures with aliphatic hydrocarbons such as are formed for instance in the catalytic hydrogenation of carbon monoxide. Another way of effecting such a separation is the fractionated adsorption of oxygen-containing compounds by active fuller's earth or aluminum hydroxyde. A third way for isolating oxygen compounds consists in subjecting the mixtures as a whole to an alkali melt, whereby the alcohols which form approximately 90% of the oxygen compounds present in the mixtures, are converted almost completely into salts of fatty acids (soaps) which can easily be isolated, for instance by the formation of layers.

All these known processes involve the drawback of requiring a rather circumstantial mode of operation.

We have now found that it is possible to effect in a simple manner and by mere distillation a practically complete isolation of alcohols in pure state from such mixtures, accompanied by a partial separation of other oxygen-containing compounds. Our method of effecting the separation consists in adding to fractions of the mixture to be treated an alcohol, and preferably propanol, diluted with water. If such a mixture is subjected to distillation, an azeotropic mixture of hydrocarbons, added alcohol and water will be driven over, whereupon the alcohols and other oxygen-containing compounds which remained in the residue, can be isolated by distillation, if necessary in vacuo, or by other well known methods.

The mixtures to be treated for separation are preferably subdivided into fractions containing from 3 to 6 consecutive C-numbers.

In the process according to this invention the hydrocarbons present in the mixture, after a low-molecular alcohol and water have been added, form during distillation ternary azeotropic mixtures which boil at materially lower temperatures than the oxygen-containing compounds which thus remain in the residuum. In this manner we succeed in completely separating the hydrocarbons, in contrast to their behaviour when subjected to ordinary distillation, where they tend to be distilled off together with the alcohols and other oxygen-containing organic compounds present.

The alcohol mixed with water which is added according to this invention in order to form a ternary mixture, must have a lower C-number than the lowest alcohol present in the mixture under treatment, for instance in a fraction resulting from the hydrogenation of carbon monoxide. We have found that propanol is particularly suitable for use as added alcohol. Preferably propanol recovered from the products of a carbon monoxide hydrogenation is used.

When the azeotropic mixture of hydrocarbons, added alcohol and water is condensed, two layers are formed, the upper one consisting almost exclusively of distilled hydrocarbons. This layer is separated by overflow. If it should contain small quantities of the added alcohol, for instance propanol, this alcohol is separated from it by distillation in a separate column. The added alcohol thus separated can be returned into the azeotropic distillation.

Besides distillation, also a treatment with water may be resorted to for freeing the upper layer of the azeotropic condensate which mainly consists of hydrocarbons, from its content of alcohol. This step of washing with water is preferably effected in counter-current.

The lower aqueous layer of the condensate contains, besides water, only the added alcohol, such as dilute propyl alcohol. This aqueous layer is returned into the distillation column used in the treatment of the initial mixture, to be once more subjected to azeotropic distillation.

After the hydrocarbons have been driven over completely under the form of ternary mixtures boiling azeotropically, there finally passes over a binary mixture of water and added alcohol, i. e. mainly dilute propyl alcohol. The boiling temperature then rises by leaps and bounds. This phenomenon indicates that the residue still present in the distillation column practically consists only of oxygen-containing carbon compounds and in the first line alcohols. This residue of distillation, when distilled under normal, raised or lowered pressure, leads to the recovery of the alcohols present in it with rising C-numbers and a high degree of purity. Instead of subjecting the residuum to distillation, it may also be subjected to selective extraction or to melting with alkali or to some other well known method of separation.

When mixtures containing hydrocarbons and organic oxygen compounds are treated in accordance with this invention, the hydrocarbons present are also separated according to their C-numbers, for the boiling points of the ternary mixtures rise in proportion to the rising C-numbers, so that in a highly selective fractionating column the separation according to the individual C-numbers is possible.

Apart from products of the catalytic hydrogenation of carbon monoxide, the new process is also well adapted for treating other mixtures of hydrocarbons with oxygen-containing carbon compounds resulting from industrial processes, such as for instance the catalytic addition of mixtures of carbon monoxide and hydrogen to olefines. Similar mixtures are also obtained in the working-up of petroleum products and in other catalytic processes. In naturally occurring raw materials and in the products of their conversions similar mixtures are sometimes present.

In the operation of our invention we may, for instance, proceed as follows:

Example 1

A fraction boiling between 110 and 160° C., obtained in the hydrogenation of carbon monoxide at a pressure of 20 kg./sq. cm. by the action of an iron catalyst, was mixed with about 25% by volume of propyl alcohol diluted with 25% water and the mixture was subjected to distillation. In three fractions ternary mixtures passed over at 81° C., 85° C., and 88° C., respectively. In these fractions $C_8$-, $C_9$- and $C_{10}$-hydrocarbons, respectively, predominated. After the azeotropic distillation of hydrocarbons had come to an end, the water-diluted propyl alcohol still present passed over at a temperature above 88° C. in the form of a binary mixture. At the end of this operation the boiling temperature rose considerably.

From the residuum remaining over after the azeotropic distillation had come to an end, $C_4$-, $C_5$- and $C_6$-alcohols could be separated in a satisfactory state of purity by simple distillation.

Example 2

From the products of hydrogenation of carbon monoxide in contact with an iron catalyst at a pressure of about 15 kg./sq. cm. a primary fraction boiling between 160 and 204° C. was separated. This fraction had the following characteristic.

Neutralization number _____ 2.2
Iodine number _____ 35
Hydroxyl number _____ 250
Carbonyl number _____ 12
Ester number _____ 16.5

This fraction was mixed with propanol containing 25% by volume water.

In the azeotropic distillation of this fraction there was obtained in the condensate a hydrocarbon layer which still contained about 5% propanol. This layer was separated from the aqueous layer of the condensate below it by decantation and washed with water in counter-current until the hydrocarbons were freed from propyl alcohol altogether. The watery layer and the solution obtained on washing the hydrocarbons were distilled in a separate column. The binary mixture of propanol and water was returned into the azeotropic distillation process. The quantity of hydrocarbons thus obtained amounted to 36% by volume of the original primary fraction.

At the end of the azeotropic distillation of hydrocarbons there remained over a residuum, from which $C_7$-, $C_8$- and $C_9$-alcohols were recovered in a high state of purity by distillation in vacuo.

Various changes may be made in the performance of the process above described without departing from the invention or sacrificing the advantages thereof.

We claim:

The process of recovering higher alcohols from their mixtures with aliphatic hydrocarbons obtained from the hydrogenation of CO with iron catalysts, which comprises separating from such mixtures two fractions, a first fraction having a boiling point of from 110° to 160° C. and containing the $C_4$ to the $C_6$ alcohols as well as the corresponding boiling point hydrocarbons, and a second fraction having a boiling point of 160° to 204° C. and containing the $C_7$ to the $C_9$ alcohols together with the corresponding boiling point hydrocarbons, adding to each of the said fractions sufficient quantity of propyl alcohol diluted with approximately 25% water to form ternary azeotropes with all of the hydrocarbons present, subjecting each fraction to distillation to drive off an azeotropic mixture of hydrocarbons, added propyl alcohol and water and producing in each case a residual liquor containing the alcohols and treating each of said residual liquors for the recovery and separation of the alcohols therein.

BRUNO TRAEGER.
WALTER ROTTIG.

References Cited in the file of this patent

UNITED STATES PATENTS

| Number | Name | Date |
| --- | --- | --- |
| 2,099,475 | Giesen et al. | Nov. 16, 1925 |
| 2,360,655 | Deanesly | Oct. 17, 1944 |
| 2,360,685 | Jensen | Oct. 17, 1944 |
| 2,386,755 | Spiers | Oct. 16, 1945 |
| 2,410,642 | Farkas et al. | Nov. 5, 1946 |